(No Model.)   2 Sheets—Sheet 1.

J. F. DODGE.
BELLOWS.

No. 342,686. Patented May 25, 1886.

WITNESSES,
Wm. S. Billings.
M. Dean Overell.

INVENTOR,
James F. Dodge
per Brown Bros
Attorneys

N. PETERS, Photo-Lithographer, Washington, D. C.

(No Model.) 2 Sheets—Sheet 2.
J. F. DODGE.
BELLOWS.
No. 342,686. Patented May 25, 1886.
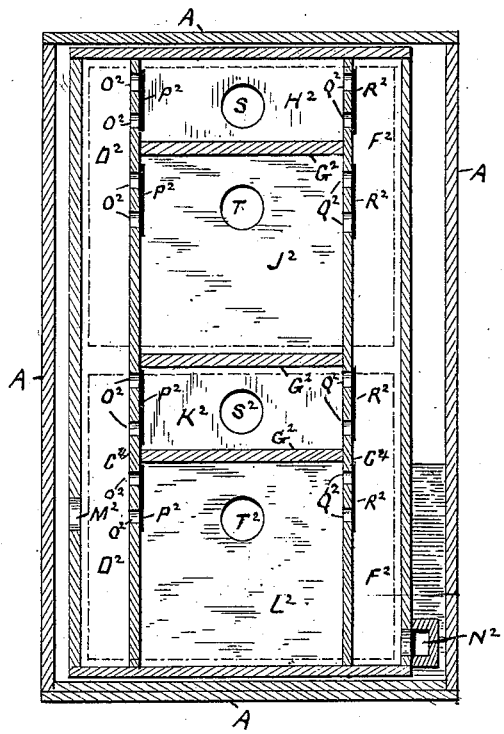
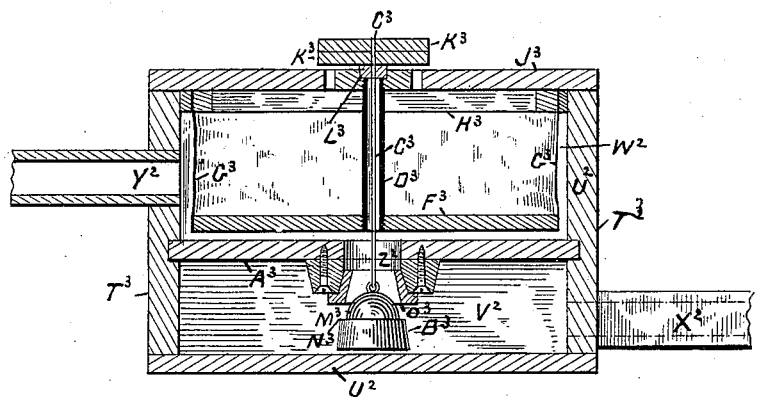
WITNESSES.
INVENTOR,
James F. Dodge
per
Brown Bros.
Attorneys.

UNITED STATES PATENT OFFICE.

JAMES F. DODGE, OF WINTHROP, MASSACHUSETTS.

BELLOWS.

SPECIFICATION forming part of Letters Patent No. 342,686, dated May 25, 1886.

Application filed November 16, 1885. Serial No. 182,974. (No model.)

*To all whom it may concern:*

Be it known that I, JAMES F. DODGE, of Winthrop, in the county of Suffolk and State of Massachusetts, have invented certain new and useful Improvements in Apparatus for Carbureting, of which the following is a full, clear, and exact description.

This improvement in carburetors relates particularly to the apparatus thereof for forcing air through the liquid hydrocarbon for the purpose of charging the same with the vapors thereof, and thereby producing hydrocarbon-vapor gas to be used for the purposes of illumination or heating and for regulating the pressure of air so forced; and the main objects of the invention are to have the air, which is forced by the forcing apparatus of the carburetor, dry—that is, not charged with moisture—and to secure a uniform pressure thereof, the advantages of which are so well known to all conversant with the use and operation of carburetors for lighting and heating purposes as to require no particular mention herein.

The apparatus of this invention is composed in one part of a combination of bellows and air-passages for forcing and conducting the air into the carburetors, and in the other part of a regulator for regulating the pressure of the air so forced and conducted by the combination of the bellows and air-passages, and enabling it to be maintained at a uniform pressure and so supplied to the liquid hydrocarbon with which it is to be charged to produce hydrocarbon-vapor gas, all substantially as hereinafter described.

Figure 1:
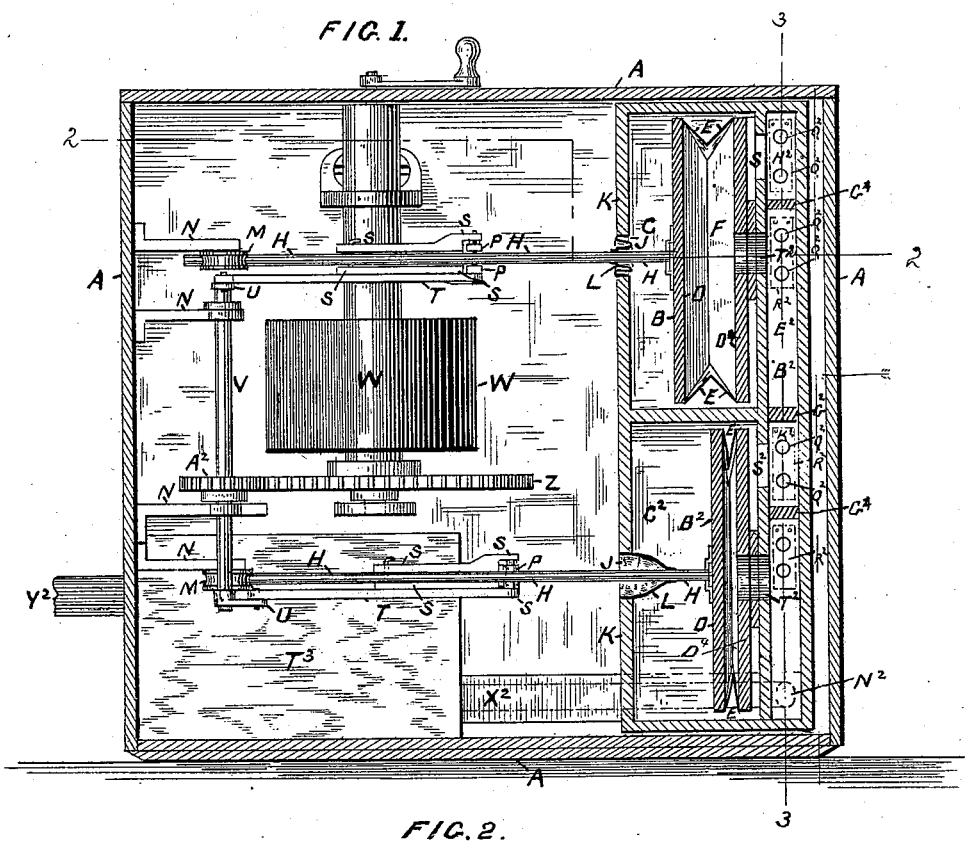
Figure 2:
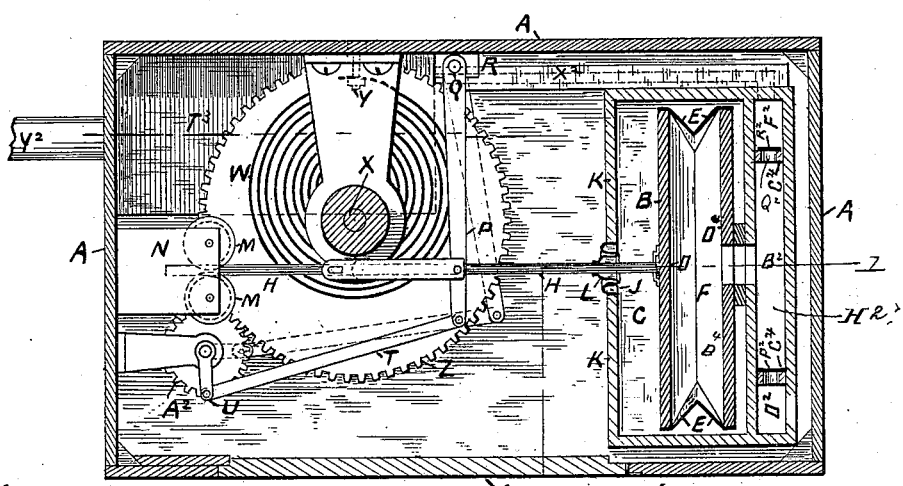

In the accompanying drawings, forming a part of this specification, Figure 1 is a vertical section illustrating a pair of bellows constructed, arranged, and operated in accordance with this invention, and showing the operating mechanism thereof in side elevation. Fig. 2 is a horizontal section on line 2 2, Fig. 1. Fig. 3 is a vertical section on line 3 3, Fig. 1. Fig. 4 is a vertical section on line 4 4, Fig. 1, and particularly of the pressure-regulating apparatus of this invention.

In the drawings, the apparatus of this invention, as a whole, is shown as inclosed in a box or casing, A, common thereto; but this is not necessary, as will be obvious from the description hereinafter given.

$B\ B^2$ are two bellows, each arranged in a separate chamber, $C\ C^2$, inclosed on all sides. Each bellows is in two leaves or boards, $D\ D^4$, both placed vertically and opposite to each other and connected around the edges with leather E, or other suitable flexible material, the whole so as to form an inclosed chamber, F, which is enlarged or contracted by opening the boards $D\ D^4$ from or closing them upon each other.

The board $D^4$ of each bellows is rigidly fastened to one of the vertical walls of its inclosing-chamber $C\ C^2$, and the board D is movable, and at the center has a pitman-rod, H, fastened to it, which passes loosely through a hole, J, in the vertical side wall, K, of the inclosing-chamber $C\ C^2$ of the bellows, and is joined to the edges of said hole by a leather or other flexible folding nipple, L, so as to close said hole to the entrance of air to and its escape from the chamber $C\ C^2$. Each pitman-rod H moves in a straight line, and between grooved and supporting guide-rollers M therefor, hung in stationary bearings N, and also between the outer forked end of a horizontal arm, P, fulcrumed at Q to a stationary support, R, therefor, and pivoted to one end of a link-arm, S, on opposite sides of the pitman-rod H, and the other end of said link S is pivoted to the pitman-rod at a point between the grooved bearing-rollers M therefor and the forked end of the horizontal and fulcrumed arm P. Each horizontal arm or lever P at its outer end is connected by a rod, T, to a crank-arm, U, of a common vertical driving-shaft, V, turning in suitable bearings and adapted to be continuously rotated in any suitable manner—as, for instance, from the uncoiling or unwinding of a coiled or wound spring, W, connected at its inner end to a vertical shaft, X, and at its outer end to a stationary fastening, Y, therefor, and said shaft X is connected through a train of gear-wheels, Z and $A^2$, to the vertical driving-shaft V, all as plainly shown in the drawings, Figs. 1 and 2.

In lieu of a coiled spring for operating the driving-shaft V, as described, a weight or other suitable power may be used.

The crank-arms U are set quartering, and thus from the continuous rotating of the driving-shaft V each of the bellows $B\ B^2$ is opened and closed, and the one after the other, securing a continuous forcing of air thereby, as will hereinafter appear.

At one side, and outside of the side wall of the bellows-inclosing chambers, to which are attached the stationary boards $D^4$ of the bellows, is a compartment divided by parallel vertical partitions $C^4$ into two chambers, $D^2$ $F^2$, one at each side of a middle or intermediate chamber, itself divided by three horizontal partitions, $G^2$, into four separate and distinct chambers, $H^2$ $J^2$ $K^2$ $L^2$.

$M^2$ is a port or opening, for making communication in any suitable manner with the external air, and for the entrance thereof into the chamber $D^2$.

$N^2$ is a port or opening for making communication in any suitable manner with the carbureting apparatus, (not shown,) and preferably through an air-pressure regulator, as hereinafter described, and the chamber $F^2$.

$O^2$ are ports in one of the vertical partitions $C^4$ and making air-communication between the chamber $D^2$ at one side of said partition and the several chambers $H^2$ $J^2$ $K^2$ $L^2$, made by the horizontal partition $G^2$ at the other side of said vertical partition, and in each instance these ports $O^2$ are provided with a leather flap-valve, $P^2$, vertically placed and secured at its upper end only and within the chambers $H^2$ $J^2$ $K^2$ $L^2$, and so as to open inwardly in relation to them and outwardly in relation to the chamber $D^2$.

$Q^2$ are air-ports in one of the vertical partitions $C^4$, and making communication between the chamber $F^2$, at one side of said partition, and the several chambers $H^2$ $J^2$ $K^2$ $L^2$, made by horizontal partitions $G^2$ at the other side of said vertical partition $C^4$, and in each instance these ports $Q^2$ are provided with a leather flap-valve, $R^2$, vertically placed and secured at the upper end and within the chamber $F^2$, and so as to open inwardly in relation thereto, and outwardly in relation to the chambers $H^2$ $J^2$ $K^2$ $L^2$. Hanging these flap-valves vertically, as described, renders them most sensitive in operation.

$T$ $T^2$ are air-ports, the one making communication between the horizontal chamber $J^2$ and the inclosed chamber of one, $C$, of the bellows $B$ $B^2$, and the other between the horizontal chamber $L^2$ and the inclosed chamber of the other bellows, $B^2$, and $S$ $S^2$ are air-ports, the one making communication between the chamber $H^2$ and the compartment $C$, inclosing the bellows $B$, and the other between the compartment $C^2$, inclosing the bellows $B^2$.

The air-ports $O^2$ are for the passage of air from the air-supply port $M^2$ into the several chambers $H^2$ $J^2$ $K^2$ $L^2$, one above the other, and the air-ports $Q^2$ are for the passage of air from said several chambers into the chamber $F^2$, and thence to the carburetor, as has been described, and from the working of the pair of bellows, as has been described, dry air, under pressure, is forced continuously through the discharge-ports $Q^2$ and passage $N^2$, and thence to the carburetor, passing through a pressure-regulator, $T^3$, to be now described. This pressure-regulator, Fig. 4, is composed of a casing, $U^2$, divided horizontally into two chambers, $V^2$ $W^2$, one above the other, and the lower, $V^2$, connected with the discharge of the bellows at $X^2$, and the upper, $W^2$, at $Y^2$, with the carbureting apparatus, (not shown,) and which may be of any suitable construction and arrangement of parts.

$Z^2$ is an opening through the center of the partition $A^3$, dividing the casing into upper and lower chambers, $W^2$ and $V^2$. $B^3$ is a valve for opening and closing said opening $Z^2$. This valve $B^3$ is suspended from the lower end of a vertical stem, $C^3$, which passes upward through the opening $Z^2$ and through a vertical tube, $D^3$, at its lower end rigidly attached to the center of a horizontal board, $F^3$, in upper chamber, $W^2$. This board is joined at and around its edges by a leather or other flexible side and inclosing-piece, $G^3$, to the edges of another and parallel board, $H^3$, therewith, fastened against the under side of the upper wall or roof, $J^3$, of the upper chamber, $W^2$. The vertical tube $D^3$ passes loosely through the center of this upper board, $H^3$, and it is closed at its upper end, and the valve-stem $C^3$ is attached to said vertical closed end and preferably extended through it to make a guide and holding stem for the application of weights $K^3$, to weight the lower board, $F^3$, as may be desired, the weights so applied resting upon each other, and the lower upon a rest, $L^3$, attached to the upper end of said vertical tube.

The air forced from the working of the bellows $B$ $B^2$ passes into the lower chamber, $V^2$, of the regulator, thence through the opening $Z^2$ thereof into the upper chamber, $W^2$, and thence out at the outlet $Y^2$, to the carburetor, (not shown,) and under the pressure of the air so passing if the same is greater than the weighting of the lower and flexibly-connected board $F^3$, then said board is lifted, securing a closing of said opening $Z^2$ by the valve $B^3$ therefor, arranged and connected to said moving board $F^3$, as has been before described. In this manner the pressure of the air forced from the working of the bellows may be regulated at pleasure, by adjusting the weighting of the movable board $F^3$ in the upper chamber, $W^2$. The valve $B^3$ of the regulator has a hemispherical knob or projection, $M^3$, on its upper side, which entering into the opening $Z^2$ as the valve closes, and the valve seats by its shoulder $N^3$, surrounding the base of said knob against the face $O^3$ at the lower end of the opening $Z^2$. This shaping of the valve $B^3$ tends to secure a gradual opening and closing of the passage $Z^2$, and thus prevents sudden action of the regulator.

Although only one pair of bellows has been herein described and shown, more than one pair may be used and operated from a common driving-shaft through connecting mechanism, substantially such as described, or other suitable connecting mechanism. The moving leaf or board D⁴ of each bellows B B² works in a straight line to and from the stationary leaf or board D⁴, and the mechanism connecting its operating-rod H with the operating-crank therefor enables the same to so work without strain upon said operating-rod.

The dry air-forcing-bellows of this invention and air-pressure regulator are located in the house or building, and the carburetor proper in an adjoining building or structure, for safety against fire.

Having thus described my invention, I claim—

1. An air-blower for carburetors, &c., composed of separate inclosed compartments, each containing a bellows having a stationary and a movable leaf or board adapted by suitable mechanism to be opened from and closed upon the stationary board, in combination with an inclosed compartment divided into vertical and horizontal chambers, having air-ports provided with valves for opening and closing the same and making communication between them and the inside of the bellows and the compartment in which the bellows is located, and inlet and outlet passages in communication, respectively, with said chambers, substantially as described, for the purposes specified.

2. An air-blower for carburetors, &c., composed of separate inclosed compartments, each containing a bellows having a stationary and a movable leaf or board connected through a pitman-rod, H, having a flexible nipple, L, closing the opening J, through which said rod moves to suitable operating mechanism to open and close the movable leaf, and in relation to the stationary leaf, in combination with an inclosed compartment, divided into vertical and horizontal chambers having air-ports provided with valves for opening and closing the same and making communication between them and the inside of the bellows and the compartment in which the bellows is located, and inlet and outlet passages in communication, respectively, with the said chambers, substantially as described, for the purpose specified.

3. The combination, with an air-blower for carburetors, &c., of a pressure-regulating apparatus connected with said blower and with the carburetor, &c., constructed of two compartments, the one connected with the blower and the other with the carburetor, &c., and having communication with each other through an opening provided with a valve for closing it, and said valve carried by a moving board flexibly connected to a stationary board and adapted to be weighted, and the whole arranged and located in the compartments, substantially as described, for the purpose specified.

In testimony whereof I have hereunto set my hand in the presence of two subscribing witnesses.

J. F. DODGE.

Witnesses:
 WM. DEAN OVERELL,
 WM. S. BELLOWS.